United States Patent
Baeuerle et al.

(10) Patent No.: US 10,288,015 B2
(45) Date of Patent: May 14, 2019

(54) METHOD FOR CHECKING THE FUNCTIONALITY OF A DIFFERENTIAL PRESSURE MEASURING UNIT OF A MOTOR VEHICLE EXHAUST GAS RECIRCULATION SYSTEM

(71) Applicant: Robert Bosch GmbH, Stuttgart (DE)

(72) Inventors: Michael Baeuerle, Eberdingen (DE); Daniel Haege, Freiberg Am Neckar (DE); Andreas Roth, Muehlacker-Lomersheim (DE); Michael Nau, Dornhan/Aischfeld (DE)

(73) Assignee: Robert Bosch GmbH, Stuttgart (DE)

( * ) Notice: Subject to any disclaimer, the term of this patent is extended or adjusted under 35 U.S.C. 154(b) by 213 days.

(21) Appl. No.: 15/021,970

(22) PCT Filed: Aug. 5, 2014

(86) PCT No.: PCT/EP2014/066827
§ 371 (c)(1),
(2) Date: Mar. 15, 2016

(87) PCT Pub. No.: WO2015/039800
PCT Pub. Date: Mar. 26, 2015

(65) Prior Publication Data
US 2016/0222925 A1    Aug. 4, 2016

(30) Foreign Application Priority Data
Sep. 17, 2013    (DE) .................. 10 2013 218 612

(51) Int. Cl.
*F02D 41/00* (2006.01)
*F02M 26/49* (2016.01)
(Continued)

(52) U.S. Cl.
CPC .............. *F02M 26/49* (2016.02); *F02D 9/02* (2013.01); *F02D 41/0055* (2013.01);
(Continued)

(58) Field of Classification Search
CPC ........ F02M 26/49; F02M 26/06; F02M 26/10; F02M 26/47; F02M 26/15; F02M 26/23;
(Continued)

(56) References Cited

U.S. PATENT DOCUMENTS 4,715,348 A    12/1987    Kobayashi et al.
6,480,782 B2 *  11/2002   Brackney ............ F02D 41/0052
                                                    123/568.21
(Continued)

FOREIGN PATENT DOCUMENTS

DE    102011017779    10/2012
EP    2169199    3/2010
EP    2562406    2/2013

OTHER PUBLICATIONS

International Search Report for Application No. PCT/EP2014/066827 dated Nov. 10, 2014 (English Translation, 2 pages).

*Primary Examiner* — Hai H Huynh
*Assistant Examiner* — Gonzalo Laguarda
(74) *Attorney, Agent, or Firm* — Michael Best & Friedrich LLP

(57) ABSTRACT

The invention relates to a method for checking a functionality of a differential pressure measuring unit (31) in an exhaust gas recirculation system (1) of a motor vehicle, and a corresponding exhaust gas recirculation system (1). In an air intake duct (5), a sensor flap (11) is provided downstream of an air filter (9) and upstream of an opening (37) of an exhaust gas recirculation duct (25). This sensor flap (11) is set in two different positions and a value of a pressure drop in the exhaust gas stream is measured for each position as (Continued)

said gas stream flows through an exhaust gas recirculation stream valve (29) provided in the exhaust gas recirculation duct (25). If the measured pressure drop does not significantly change despite the movement of the sensor flap (11), it can be assumed that there is a fault in the differential pressure measuring unit (31). In particular, it is possible to detect when a hose (41), which connects a differential pressure sensor of the differential pressure measuring unit (31) to a connector (35) on the exhaust gas recirculation duct (25) downstream of the exhaust gas recirculation stream valve (29) has torn, slipped off or become blocked.

10 Claims, 1 Drawing Sheet

(51) Int. Cl.

| | |
|---|---|
| *F02D 41/22* | (2006.01) |
| *F02D 9/02* | (2006.01) |
| *F02M 26/06* | (2016.01) |
| *F02M 26/10* | (2016.01) |
| *F02M 26/47* | (2016.01) |
| *F02D 41/12* | (2006.01) |
| *F02D 11/10* | (2006.01) |
| *F02M 26/15* | (2016.01) |
| *F02M 26/23* | (2016.01) |

(52) U.S. Cl.
CPC ....... *F02D 41/0065* (2013.01); *F02D 41/222* (2013.01); *F02M 26/06* (2016.02); *F02M 26/10* (2016.02); *F02M 26/47* (2016.02); *F02D 11/10* (2013.01); *F02D 41/0007* (2013.01); *F02D 41/0072* (2013.01); *F02D 41/123* (2013.01); *F02M 26/15* (2016.02); *F02M 26/23* (2016.02); *Y02T 10/47* (2013.01)

(58) Field of Classification Search
CPC .... F02D 9/02; F02D 41/0055; F02D 41/0065; F02D 41/222; F02D 41/0007; F02D 41/123; F02D 41/0072; F02D 11/10; Y02T 10/47
See application file for complete search history.

(56) References Cited

U.S. PATENT DOCUMENTS

| | | | |
|---|---|---|---|
| 6,850,833 | B1 | 2/2005 | Wang et al. |
| 9,267,453 | B2 * | 2/2016 | Surnilla ................. F02M 26/07 |
| 2001/0003919 | A1 * | 6/2001 | Nusser ................... F02D 21/08 |
| | | | 73/114.76 |
| 2012/0272938 | A1 | 11/2012 | Blumendeller et al. |

* cited by examiner

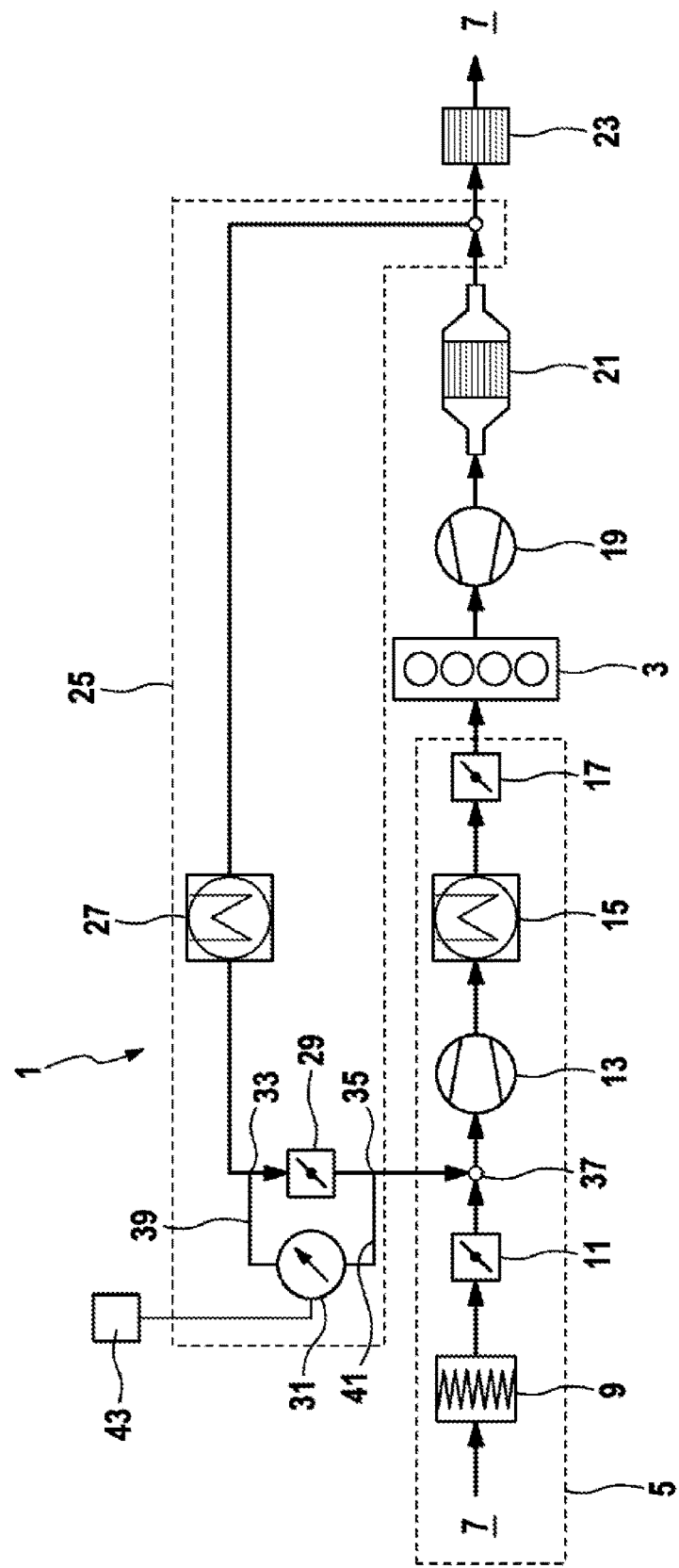

METHOD FOR CHECKING THE FUNCTIONALITY OF A DIFFERENTIAL PRESSURE MEASURING UNIT OF A MOTOR VEHICLE EXHAUST GAS RECIRCULATION SYSTEM

BACKGROUND OF THE INVENTION

The present invention relates to an exhaust gas recirculation system in a motor vehicle comprising a differential pressure measuring unit. In particular, the invention relates to a method for checking a functionality of a differential pressure measuring unit provided in such an exhaust gas recirculation system.

Exhaust gas recirculation systems are used in motor vehicles, inter alia, in order to reduce pollutant emissions in exhaust gases from an internal combustion engine. To this end, exhaust gases originating from the internal combustion engine are directed, at least in part, back into the internal combustion engine. By feeding such exhaust gases, in addition to fresh air, which is also fed, to the internal combustion engine, it is possible to reduce a formation of nitrogen oxides, for example, during combustion, given that the exhaust gases, as inert gas, are chemically inactive.

In order to optimize the combustion in the internal combustion engine, a rate at which exhaust gases are recirculated should be matched as exactly as possible to an impending operating state of the internal combustion engine. In order to enable an exhaust gas recirculation rate to be influenced, an exhaust gas return flow valve is disposed, for this purpose, in an exhaust gas recirculation channel, through which exhaust gases from the internal combustion engine are directed back into an air intake channel, which exhaust gas return flow valve is designed to be capable of controllably throttling an exhaust gas flow in the exhaust gas recirculation channel.

In order to enable a desired exhaust gas recirculation rate to be set as precisely as possible with the aid of the exhaust gas return flow valve, it should be possible to precisely determine the exhaust gas recirculation rate actually prevailing during the operation of the internal combustion engine. To this end, it can be provided, for example, to measure an opening cross section of the exhaust gas return flow valve, a differential pressure across the exhaust gas return flow valve, and an exhaust gas temperature and, on the basis thereof, to determine the exhaust gas recirculation rate.

A method for determining a low-pressure exhaust gas recirculation mass flow in an air system of an internal combustion engine is described, for example, in DE 10 2011 017 779 A1.

In conventional exhaust gas recirculation systems, however, a functionality of a differential pressure measuring unit, which is used for measuring the differential pressure across the exhaust gas return flow valve, generally cannot be checked. In particular, it cannot be checked whether one or multiple pressure sensors, which are supposed to measure a currently prevailing pressure in the exhaust gas to be recirculated, upstream of the exhaust gas return flow valve on the one hand and downstream of the exhaust gas return flow valve on the other hand, so that, on the basis thereof, the differential pressure can be determined, function correctly, and/or corresponding connections to the exhaust gas recirculation channel are intact.

SUMMARY OF THE INVENTION

Embodiments of the present invention make it possible to advantageously check a functionality of the differential pressure measuring unit in an exhaust gas recirculation system equipped with a differential pressure measuring unit. By means of the check, it can be detected, inter alia, whether one or multiple pressure sensors of the differential pressure measuring unit or connections, which connect such pressure sensors to associated connectors on the exhaust gas recirculation channel, are intact, in particular for a pressure sensor disposed downstream of the exhaust gas return flow valve and connected to a connector disposed there.

According to a first aspect of the invention, a method for checking a functionality of a differential pressure measuring unit in an exhaust gas recirculation system of a motor vehicle is proposed. In this case, the exhaust gas recirculation system comprises an air intake channel, an exhaust gas recirculation channel, an exhaust gas return flow valve, a differential pressure measuring unit, and an airflow sensor plate. The air intake channel is used to feed air to an internal combustion engine. The exhaust gas recirculation channel is used to recirculate exhaust gases from the internal combustion engine back into the air intake channel. The exhaust gas return flow valve is disposed in the exhaust gas recirculation channel and is used for controllably throttling an exhaust gas flow in the exhaust gas recirculation channel. The differential pressure measuring unit is designed to measure a pressure drop in an exhaust gas flow flowing through the exhaust gas return flow valve. The airflow sensor plate is used for controllably blocking air to be fed upon entry into the air intake channel and is disposed in such a way that the exhaust gas recirculation channel leads into the air intake channel downstream of this airflow sensor plate. The proposed method is distinguished by the following method steps, which should preferably be carried out in the indicated sequence. First, the airflow sensor plate is set in a first position. Next, a first value of a pressure drop in the exhaust gas flow is measured by means of the differential pressure measuring unit as said exhaust gas flows through the exhaust gas return flow valve. After this, the airflow sensor plate is set in a second position, wherein the second position differs from the first position and can be opened further or closed further. Next, a second value of the pressure drop in the exhaust gas flow is measured by means of the differential pressure measuring unit as said exhaust gas flows through the exhaust gas return flow valve. On the basis of the measured first and the measured second value of the pressure drop, the functionality of the differential pressure measuring unit can finally be deduced and a signal indicating the functionality of the differential pressure measuring unit can be generated.

According to a second aspect of the present invention, an exhaust gas recirculation system for a motor vehicle comprising a differential pressure measuring unit is proposed, wherein the exhaust gas recirculation system comprises an air intake channel, an exhaust gas recirculation channel, an exhaust gas return flow valve, and a differential pressure measuring unit. In addition, the exhaust gas recirculation system also comprises an airflow sensor plate for controllably blocking air, which is supposed to be fed, upon entry into the air intake channel, wherein the airflow sensor plate is disposed in such a way that the exhaust gas recirculation channel leads into the air intake channel downstream of the airflow sensor plate. The proposed exhaust gas recirculation system should be designed, in particular, to be capable of carrying out a method according to the aforementioned first aspect of the invention.

In this case, the airflow sensor plate can be provided between an air filter, which is likewise provided in the exhaust gas recirculation system and which is disposed upstream of the control plate, and a throttle valve, which is also provided in the exhaust gas recirculation system and is disposed in the air intake channel downstream of the control plate.

Ideas regarding the invention can be considered, inter alia, to be based on findings and concepts described below.

Differential pressure measuring units are used in exhaust gas recirculation systems for enabling measurement of a differential pressure, i.e., a pressure difference, between a gas pressure prevailing in the exhaust gas recirculation channel upstream of the exhaust gas return flow valve, and a gas pressure prevailing in the exhaust gas recirculation channel downstream of the exhaust gas return flow valve. The differential pressure depends on the currently assumed setting of the exhaust gas return flow valve, although it is also decisively influenced by the currently prevailing operating state of the internal combustion engine. Depending on the operating state of the internal combustion engine, a positive pressure in the exhaust gas recirculation channel upstream of the exhaust gas return flow valve can be multiple hundreds of hPa, e.g., 300 hPa. A negative pressure in the exhaust gas recirculation channel downstream of the exhaust gas return flow valve is usually a great deal lower, however, and is often less than 50 hPa, usually less than 20 hPa. In particular, in operating states of the internal combustion engine in which this internal combustion engine generates only a low positive pressure or no positive pressure in the exhaust gas recirculation channel upstream of the exhaust gas return flow valve, such as, for example, during low power output or during overrun of the internal combustion engine, the differential pressure to be measured by the differential pressure measuring unit can be very low, for example, substantially less than 100 hPa, and can therefore be difficult to measure with sufficient precision.

In order to enable the differential pressure to be measured, the differential pressure measuring unit generally comprises a differential pressure sensor, which is connected to the exhaust gas recirculation system at two points, i.e., upstream of the exhaust gas return flow valve and downstream of the exhaust gas return flow valve, and is designed to measure a pressure difference between pressures prevailing there. As a result, a pressure drop across the exhaust gas return flow valve can be deduced. In principle, the differential pressure measuring unit could also be equipped with multiple pressure sensors, wherein one of the pressure sensors is designed to measure the pressure in the exhaust gas recirculation channel upstream of the exhaust gas return flow valve and the other pressure sensor is designed to measure the pressure downstream of the exhaust gas return flow valve. The differential pressure sensor or the pressure sensors are usually disposed in the differential pressure measuring unit and are each fluidically connected, via a hose, for example, to a connector in the exhaust gas recirculation channel upstream or downstream of the exhaust gas return flow valve.

A fault in the functionality of the differential pressure measuring unit, which previously has been difficult to detect, can occur, in particular, when the hose leading to the differential pressure sensor or to the pressure sensor no longer establishes fluidic communication with the connector on the exhaust gas recirculation channel, for example, because it has slipped off the connector, is defective, or is blocked. In particular with respect to the hose connected to a connector provided downstream of the exhaust gas return flow valve, such a fault of the functionality of the differential pressure measuring unit can hardly be detected, since the negative pressures to be measured here are very low and, in general, are influenced by the operating state of the internal combustion engine to a substantially lesser extent than the positive pressure at the connector upstream of the exhaust gas return flow valve is.

An additional airflow sensor plate is typically provided in the air intake channel of the exhaust gas recirculation system at a position upstream of the opening of the exhaust gas recirculation channel in this air intake channel and, therefore, also at a position upstream of the connection at which the pressure in the recirculated exhaust gas is supposed to be measured downstream of the exhaust gas return flow valve. The prevailing pressure within the air intake channel or within the region of the exhaust gas recirculation channel opening into this air intake channel can be specifically changed with the aid of such an airflow sensor plate.

It is proposed to utilize this possibility of specifically changing the pressure in order to check the functionality of the differential pressure measuring unit. To this end, the airflow sensor plate is brought into two different positions, one after the other, and the current value of the pressure drop in the exhaust gas flow as said exhaust gas flows through the exhaust gas return flow valve is measured at each of the positions with the aid of the differential pressure measuring unit. Changing the position of the airflow sensor plate causes the pressure within the exhaust gas recirculation channel downstream of the exhaust gas return flow valve to change as well. Therefore, when the differential pressure measuring unit is functioning correctly, the two values of the pressure drop measured by said differential pressure measuring unit must differ from one another.

For the case, however, in which the first value of the pressure drop is essentially equal to the second value of the pressure drop, it can be deduced that the functionality of the differential pressure measuring unit is faulty. The wording "essentially equal" in this case can be understood to mean that the two measured values differ from one another at the most by a value, which is not relevant for the function of the exhaust gas recirculation system. In particular, the wording "essentially equal" can be understood to mean that the two values differ by less than 10 hPa, preferably by less than 5 hPa.

If the two differential pressure values measured at different airflow sensor plate positions do not differ substantially, a signal indicating a malfunction can be generated. This signal can then be evaluated as an indicator that, for example, the fluidic communication between the differential pressure measuring unit and the connector on the exhaust gas recirculation channel is faulty downstream of the exhaust gas return flow valve. Based on such a signal, a corresponding entry, for example, can be made in a fault memory of a control device of the motor vehicle, so that the fault can be detected and eliminated during the next inspection, at the latest.

According to one embodiment of the invention, it can be advantageous to measure the first and the second value of the pressure drop during an overrun of the internal combustion engine. During overrun, the position of the airflow sensor plate can be specifically changed for a short period, in order to test the functionality of the differential pressure measuring unit, without the behavior of the internal combustion engine thereby changing in a manner noticeable to the driver.

It can also be advantageous to monitor the operating state of the internal combustion engine and specifically change the position of the airflow sensor plate and thereby measure the first and the second value of the pressure drop which result, while the operating state of the internal combustion engine remains the same. Given that care is taken to measure the two values of the pressure drops while the operating state of the internal combustion engine remains the same, it can be ensured that changes in the pressure drop across the exhaust gas return flow valve, which are induced by the change in the position of the airflow sensor plate, are not superimposed or compensated by a varying pressure within the exhaust gas recirculation channel, which can result due to changing operating states of the internal combustion engine. A compensation of the pressure drop changes caused by the airflow sensor plate, which pressure drop changes are due to corresponding pressure changes caused by changed operating states of the internal combustion engine, could otherwise result in the two pressure drop values measured by the differential pressure measuring unit not substantially differing from one another even though the exhaust gas recirculation system and, in particular, its differential pressure measuring unit, function properly and, therefore, a signal indicating a malfunction is erroneously generated.

It is pointed out that possible features and advantages of embodiments of the invention herein are described, in part, with reference to a method according to the invention for checking the functionality of a differential pressure measuring unit in an exhaust gas recirculation system and, in part, with reference to the correspondingly designed exhaust gas recirculation system. A person skilled in the art will recognize that the individual features can be suitably combined with one another or can be substituted in order to arrive at further embodiments and, if necessary, synergistic effects.

BRIEF DESCRIPTION OF THE DRAWINGS

In the following, embodiments of the invention are described with reference to the attached drawing, wherein neither the description nor the drawing should be interpreted as limiting the invention.

FIG. 1 illustrates a functional diagram of an exhaust gas recirculation system designed according to the invention.

The FIGURE is merely schematic and is not true to scale.

DETAILED DESCRIPTION

FIG. 1 shows a schematic illustration of an exhaust gas recirculation system 1, which is designed according to the invention, having a low-pressure exhaust gas recirculation for a motor vehicle.

In order to supply an internal combustion engine 3 with oxygen, an air intake channel 5 is provided, via which air can be drawn in from an environment 7 and directed through multiple components up to the internal combustion engine 3. An air filter 9 is provided in the vicinity of an inlet of the air intake channel 5 in order to enable contaminants to be filtered out of the air drawn in from the environment 7. The purified air is then compressed in a compressor 13 and is cooled in a charge air cooler 15. A throttle valve 17 then regulates the quantity of the gas flow, which mainly consists of the air drawn in from the outside, flowing through to the internal combustion engine 3 and, in this manner, regulates the operating state of the internal combustion engine 3.

After the thus fed gas has been combusted along with the previously introduced fuel in the internal combustion engine 3, resultant exhaust gases are first directed through a turbine 19, which can utilize the kinetic energy contained in the exhaust gas in order to drive the compressor 13, for example. The exhaust gases are subsequently directed through a catalytic converter 21.

Before the exhaust gases are finally released, through a muffler 23, into the environment 7, a portion of the exhaust gases is fed to an exhaust gas recirculation channel 25. The exhaust gases are returned through this exhaust gas recirculation channel 25 and, at an opening 37 into which the exhaust gas recirculation channel 25 leads into the air intake channel 5, are added to fresh air drawn in from the outside.

In the exhaust gas recirculation channel 25, the exhaust gas first flows through an exhaust gas return flow cooler 27 and then through an exhaust gas return flow valve 29. The exhaust gas return flow valve 29 is used to throttle an exhaust gas flow within the exhaust gas recirculation channel 25 and thereby regulate a flow rate.

In order to enable the exhaust gas recirculation rate to be reliably determined, not only should the flow-through cross section through the exhaust gas return flow valve 29 and the temperature of the exhaust gas flowing through be known, but also the pressure ratios within the exhaust gas recirculation channel 25 upstream of the exhaust gas return flow valve 29 and downstream of the exhaust gas return flow valve 29, i.e., a pressure drop across the exhaust gas return flow valve 29. A differential pressure measuring unit 31 is provided in order to enable these pressure ratios to be measured. This differential pressure measuring unit contains a differential pressure sensor, which is connected via hoses 39, 41 to connectors, 33, 35 on the exhaust gas recirculation channel 25 upstream of the exhaust gas return flow valve 29 on the one hand and downstream of this exhaust gas return flow valve 29 on the other hand.

In order to now be able to check whether the differential pressure measuring unit 31 is functioning correctly and, therefore, whether the measured pressure values delivered by said differential pressure measuring unit are reliable, an airflow sensor plate 11 provided in the air intake channel 5 upstream of the opening 37 of the exhaust gas recirculation channel 25 can be specifically adjusted, within the scope of a testing procedure, and changes which occur as a result can be observed.

With the aid of the airflow sensor plate 11, a fluidic connection between a region of the air intake channel 5 upstream of this airflow sensor plate 11, which contains, inter alia, the air filter 9, and a region downstream of the airflow sensor plate 11, which contains, inter alia, the internal combustion engine 3, can be changed and, therefore, a flow-through rate and pressure ratios associated therewith, in particular downstream of the airflow sensor plate 11, can be regulated by means of the airflow sensor plate 11. Depending on the position of the airflow sensor plate 11, i.e., depending on how wide open the connection between these two subregions of the air intake channel 5 is, a different negative pressure can set in downstream of the airflow sensor plate 11 due to the suctioning effect of the internal combustion engine 3 and of the compressor 13.

In order to check whether the differential pressure measuring unit 31 functions correctly and whether, for example, the hose 41, which connects between the differential pressure sensor provided in the differential pressure measuring unit 31 and the exhaust gas recirculation channel 25 downstream of the exhaust gas return flow valve 29, is reliably and correctly connected, the airflow sensor plate 11 is brought into two different positions, one after the other, and the pressure drop across the exhaust gas return flow valve 29 is measured at the two positions by means of the differential pressure measuring unit 31.

If, for example, the differential pressure drops when the airflow sensor plate 11 is opened or if the differential pressure increases proportionally to a plate speed when the airflow sensor plate 11 is closed, it can be assumed that the differential pressure measuring unit functions correctly and the fluidic communication connection through the hose 41 is intact.

However, if the value measured by the differential pressure measuring unit 31 does not change when the position of the airflow sensor plate 11 is changed, it must be assumed that there is an error or a fault in the differential pressure measuring unit 31. In particular, this can be evaluated as an indication that the hose 41 is torn, has slipped off the connector 35, or is blocked. As a result, a signal indicating such an error or such a fault can be generated and, for example, stored in a control device 43 of the motor vehicle, which is connected to the differential pressure measuring unit 31.

An exhaust gas recirculation system according to the invention or a method according to the invention for checking the functionality of its differential pressure measuring unit can be used, in particular, in all internal combustion engines having low-pressure exhaust gas recirculation, which are charged with exhaust gas turbochargers, regardless of whether said internal combustion engines are gasoline or diesel.

The invention claimed is:

1. A method for checking a functionality of a differential pressure measuring unit (31) in an exhaust gas recirculation system (1) of a motor vehicle, wherein the exhaust gas recirculation system (1) comprises:
    an air intake channel (5) for feeding air to an internal combustion engine (3);
    an exhaust gas recirculation channel (25) for recirculating exhaust gases from the internal combustion engine (3) back into the air intake channel (5) via an opening (37);
    an exhaust gas return flow valve (29), which is disposed in the exhaust gas recirculation channel (25) for controllably throttling an exhaust gas flow in the exhaust gas recirculation channel (25); and
    an airflow sensor plate (11) provided in the air intake channel (5) upstream of the opening (37) of the exhaust gas recirculation channel (25) and for controllably throttling air to be fed upon entry into the air intake channel (5), wherein the exhaust gas recirculation channel (25) leads into the air intake channel (5) downstream of the airflow sensor plate (11);
    wherein the differential pressure measuring unit (31) is configured to measure a pressure drop in exhaust gas flowing through the exhaust gas return flow valve (29);
    the method comprising the following steps:
        setting the airflow sensor plate (11) in a first position;
        using the differential pressure measuring unit to measure a first value of a pressure drop in the exhaust gas flow as said exhaust gas flows through the exhaust gas return flow valve (29);
        moving the airflow sensor plate (11) into a second position;
        using the differential pressure measuring unit to measure a second value of the pressure drop in the exhaust gas flow as said exhaust gas flows through the exhaust gas return flow valve (29); and
        generating a signal indicating the functionality of the differential pressure measuring unit (31) based on the first value and the second value.

2. The method as claimed in claim 1, wherein when the first value of the pressure drop is essentially equal to the second value of the pressure drop, a signal indicating a faulty functionality of the differential pressure measuring unit (31) is generated.

3. The method as claimed in claim 1, wherein the differential pressure measuring unit (31) is in fluidic communication both with a connector (33) on the exhaust gas recirculation channel (25) upstream of the exhaust gas return flow valve (29) as well as with a connector (35) on the exhaust gas recirculation channel (25) downstream of the exhaust gas return flow valve (29), and
    wherein when the first value of the pressure drop is essentially equal to the second value of the pressure drop, a signal indicating a faulty functionality of the differential pressure measuring unit (31) is generated as an indicator that the fluidic communication between the differential pressure measuring unit (31) and the connector on the exhaust gas recirculation channel (25) downstream of the exhaust gas return flow valve (29) is faulty.

4. The method as claimed in claim 1, wherein the first value and the second value of the pressure drop are measured during an overrun of the internal combustion engine (3).

5. The method as claimed in claim 1, wherein the first value and the second value of the pressure drop are measured while an operating state of the internal combustion engine (3) remains the same.

6. An exhaust gas recirculation system (1) of a motor vehicle comprising a differential pressure measuring unit (31), wherein the exhaust gas recirculation system (1) comprises:
    an air intake channel (5) for feeding air to an internal combustion engine (3);
    an exhaust gas recirculation channel (25) for recirculating exhaust gases from the internal combustion engine (3) back into the air intake channel (5) via an opening (37);
    an exhaust gas return flow valve (29), which is disposed in the exhaust gas recirculation channel (25) for controllably throttling an exhaust gas flow in the exhaust gas recirculation channel (25); and
    an airflow sensor plate (11) provided in the air intake channel (5) upstream of the opening (37) of the exhaust gas recirculation channel (25) and for controllably blocking air, which is supposed to be fed, upon entry into the air intake channel (5), wherein the exhaust gas recirculation channel (25) leads into the air intake channel (5) downstream of the airflow sensor plate (11),
    wherein the differential pressure measuring unit (31) is configured to measure a pressure drop in an exhaust gas flowing through the exhaust gas return flow valve (29); and
    wherein a computer of the exhaust gas recirculation system (1) is electrically connected to the differential pressure measuring unit and is configured to carry out the method as claimed in claim 1.

7. The exhaust gas recirculation system as claimed in claim 6, further comprising: an air filter (9), which is disposed upstream of the airflow sensor plate (11); and a throttle valve (17), which is disposed in the air intake channel (5) downstream of the airflow sensor plate (11).

8. The method as claimed in claim 2, wherein the differential pressure measuring unit (31) is in fluidic communication both with a connector (33) on the exhaust gas recirculation channel (25) upstream of the exhaust gas return flow valve (29) as well as with a connector (35) on the exhaust gas recirculation channel (25) downstream of the exhaust gas return flow valve (29), and
    wherein when the first value of the pressure drop is essentially equal to the second value of the pressure drop, a signal indicating a faulty functionality of the differential pressure measuring unit (31) is generated as an indicator that the fluidic communication between the differential pressure measuring unit (31) and the connector on the exhaust gas recirculation channel (25) downstream of the exhaust gas return flow valve (29) is faulty.

9. The method as claimed in claim 8, wherein the first value and the second value of the pressure drop are measured during an overrun of the internal combustion engine (3).

10. The method as claimed in claim 9, wherein the first value and the second value of the pressure drop are measured while an operating state of the internal combustion engine (3) remains the same.

* * * * *